Figure 1:
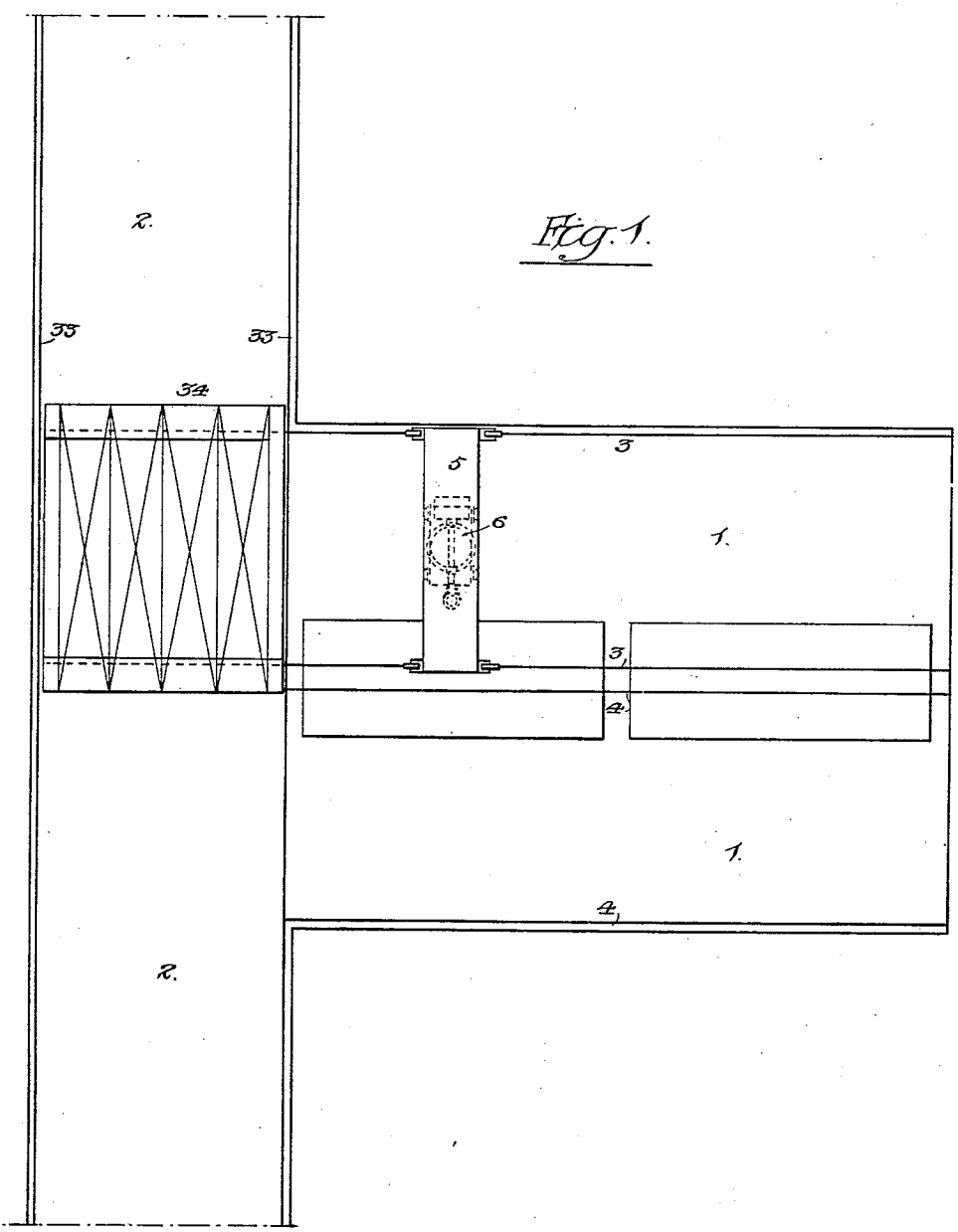

No. 655,533. Patented Aug. 7, 1900.
S. T. & C. H. WELLMAN & J. W. SEAVER.
CRANE.
(Application filed July 21, 1898.)

(No Model.) 4 Sheets—Sheet 1.

Witnesses:—
Frank L. A. Graham.
J. E. Beeletole

Inventors:—
Samuel T. Wellman.
Charles H. Wellman.
John W. Seaver.
by their Attorneys.
Howson & Howson No. 655,533. Patented Aug. 7, 1900.
S. T. & C. H. WELLMAN & J. W. SEAVER.
CRANE.
(Application filed July 21, 1898.)
(No Model.) 4 Sheets—Sheet 2.
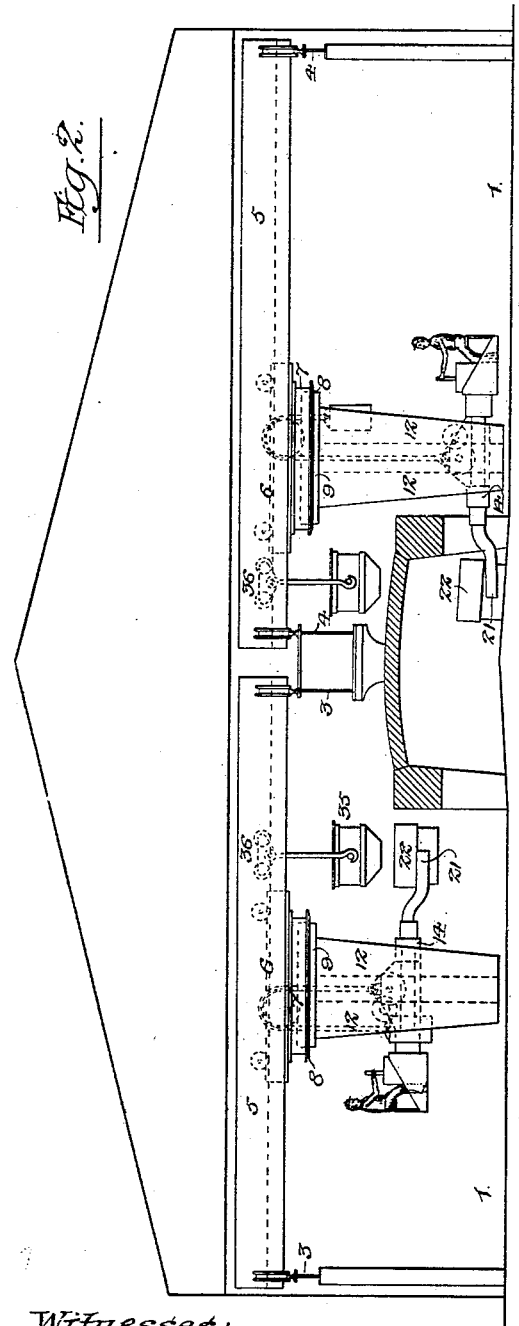
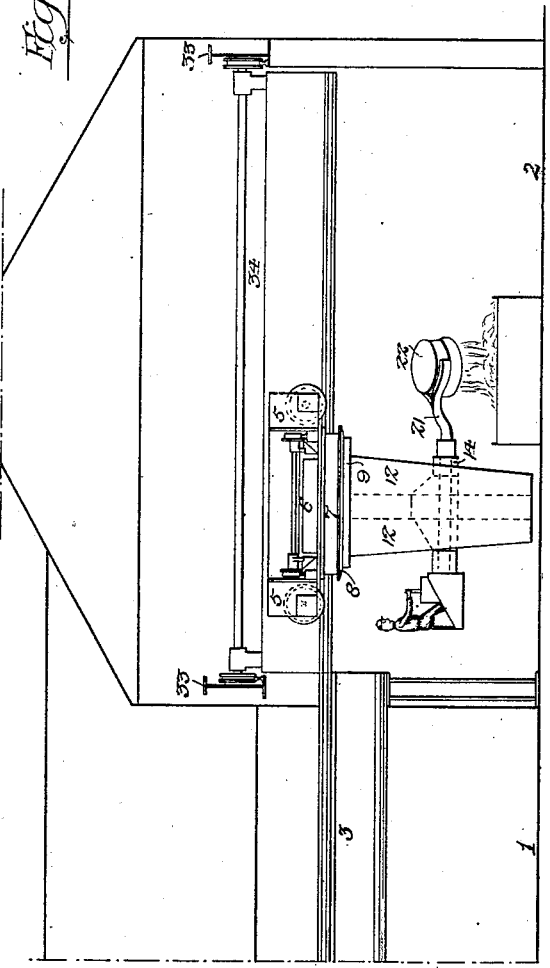
Witnesses:-
Frank L. A. Graham
J. E. Bechtold
Inventors:-
Samuel T. Wellman.-
Charles H. Wellman.-
John W. Seaver.-
by their Attorneys.
Howson & Howson

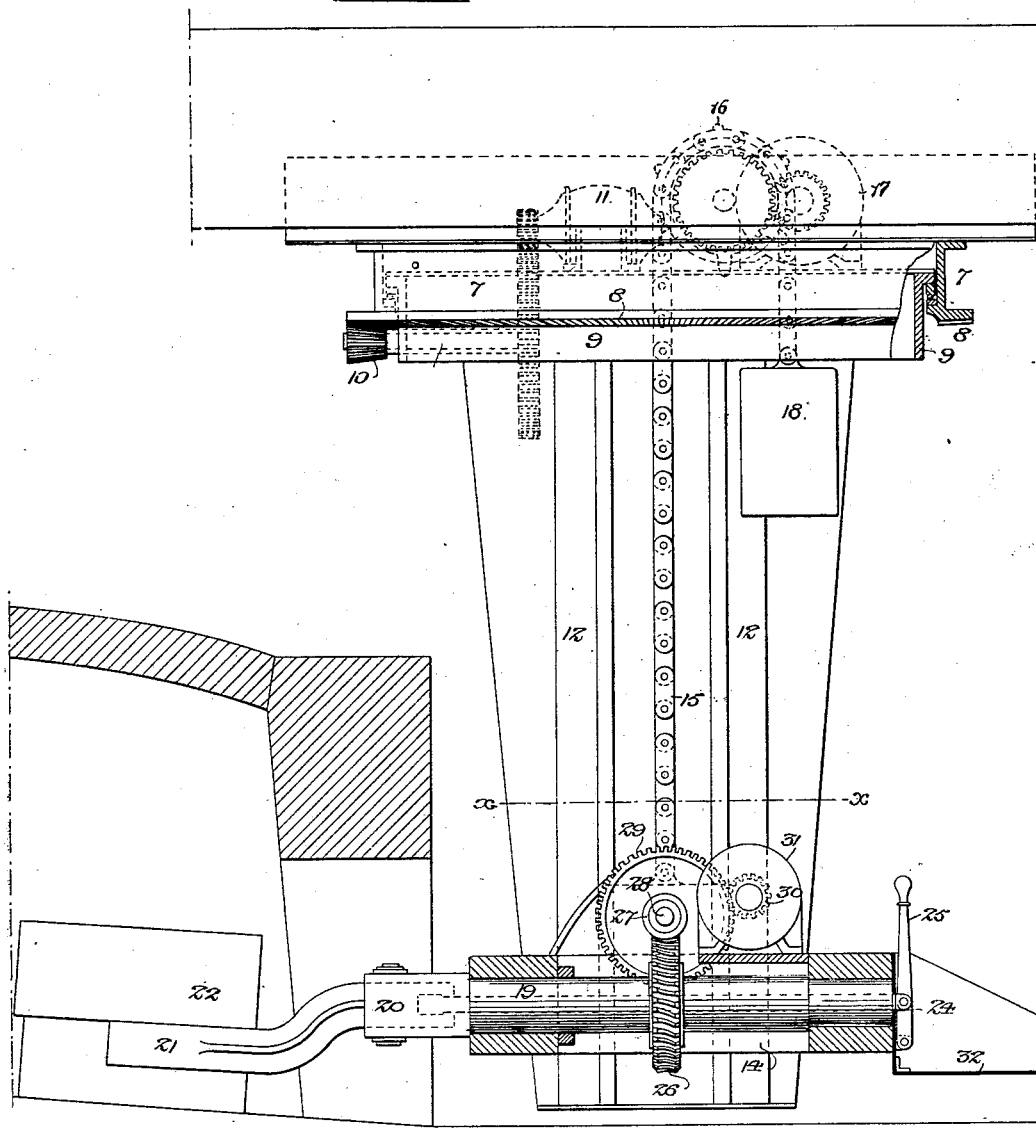

No. 655,533. Patented Aug. 7, 1900.
S. T. & C. H. WELLMAN & J. W. SEAVER.
CRANE.
(Application filed July 21, 1898.)
(No Model.) 4 Sheets—Sheet 4.
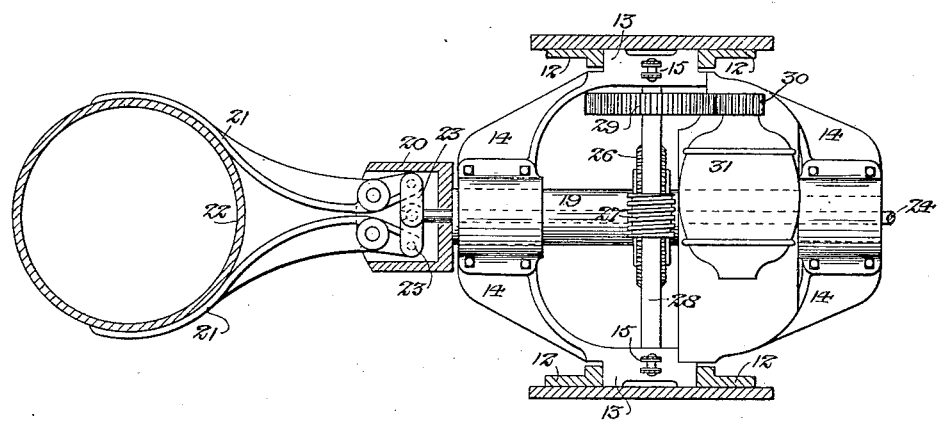
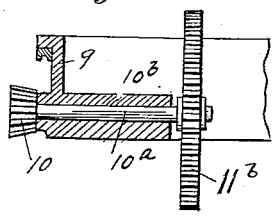

UNITED STATES PATENT OFFICE.

SAMUEL T. WELLMAN, CHARLES H. WELLMAN, AND JOHN W. SEAVER, OF CLEVELAND, OHIO, ASSIGNORS TO THE WELLMAN-SEAVER ENGINEERING COMPANY, OF SAME PLACE.

CRANE.

SPECIFICATION forming part of Letters Patent No. 655,533, dated August 7, 1900.

Application filed July 21, 1898. Serial No. 686,513. (No model.)

*To all whom it may concern:*

Be it known that we, SAMUEL T. WELLMAN, CHARLES H. WELLMAN, and JOHN W. SEAVER, citizens of the United States, and residents of Cleveland, Ohio, have invented certain Improvements in Cranes, of which the following is a specification.

Our invention consists of mechanism intended for the quick and convenient charging, handling, and pouring of glass-pots, the object of our invention being to enable these operations to be performed with the minimum amount of manual labor and with the greatest expedition.

In the accompanying drawings, Figure 1 is a diagram representing part of a glass-making plant equipped in accordance with our invention. Fig. 2 is a transverse section, on a larger scale, of the furnace-room of the plant. Fig. 3 is a transverse section, on the same scale as Fig. 2, through the casting-hall. Fig. 4 is a view, on a still larger scale, illustrating the trolley and the devices carried thereby for manipulating the glass-pot. Fig. 5 is a view, partly in plan and partly in section, on the line $x\ x$, Fig. 4. Figs. 6 and 7 are sectional details hereinafter referred to.

In Fig. 1 the furnace-room of a glass-making plant is represented at 1 and part of the casting-hall at 2, the latter being in the present instance at right angles to the furnace-room, although such arrangement is not necessary to the proper carrying out of our invention, as the furnace-room and casting-hall may occupy any desired relation to each other without departing from the main features of our invention.

Extending throughout the furnace-room are two lines of parallel girders 3 3 and 4 4, which support rails constituting runways for the wheels of one or more crane girders or bridges 5, which can thus run along the furnace-room on either side of the line of furnaces.

The crane-girder is composed of plates, beams, or shapes bolted together, so as to insure a structure of the necessary rigidity, and it has longitudinal rails for receiving the wheels of a trolley 6, which can thus be traversed from end to end of the said crane-girder.

The trolley has a rigid depending ring 7, at the bottom of which is an annular rack 8, and suitably suspended within the ring 7 is a ring 9, which carries the mechanism whereby the manipulation of the glass-pot is effected, said ring 9 being preferably mounted upon a ball-bearing in the ring 7, so that it can be freely turned therein. Such turning movement of the ring 9 is effected by means of a bevel-pinion 10, meshing with the annular rack 8 and carried by a shaft $10^a$, which is adapted to a bearing $10^b$ on the ring 9, Fig. 6, and is driven by an electric or other motor 11, of any desired character, likewise mounted upon the ring 9, as shown by dotted lines in Fig. 4, said motor-shaft having a spur-pinion $11^a$, which meshes into a spur-wheel $11^b$ on the shaft $10^a$.

Depending from the ring 9 are legs 12, which constitute guides for opposite cheek-pieces 13 upon a frame 14, said frame being suspended by means of chains 15, which pass over sprocket-wheels 16 upon a shaft mounted in bearings on the ring 9 and driven by an electric or other motor 17, the opposite depending end of each chain being provided with a counterweight 18, so that by turning the sprocket-wheels 16 the frame 14 can be readily raised or lowered. Said frame 14 has bearings for a spindle 19, having a projecting head 20, to which are pivoted the opposite arms or jaws of a pair of tongs 21, the projecting portions of these tongs being curved, so that they are adapted to grip an ordinary glass-pot 22 and the inner or short arms of the tongs being connected by toggle-levers 23 to one end of a rod 24, which passes through the spindle 19 and is adapted to be moved longitudinally by means of a lever 25 or by any other suitable mechanism having a swivel connection $24^a$ with said rod, so that the latter is free to turn with the spindle 19, as shown in Fig. 7. On said spindle 19 is a worm-wheel 26, with which meshes a worm 27 on a transverse shaft 28, the latter being geared by suitable spur-wheels 29 and 30 to the shaft of an electric or other motor 31, mounted upon the frame 14. The latter has at the inner end a platform 32, on which the attendant having charge of the device may stand or sit, and this platform may also be provided with the switches and regulators whereby the flow of current to the various electric motors is controlled when said electric motors are employed.

It will be evident from the above description that the tongs 21 can have such variety of movement as will adapt them for the performance of any duty to which they are likely to be subjected in the charging, handling, or pouring of the glass-pot. Thus the tongs can be caused to enter or can be withdrawn from the furnace by the movement of the trolley 6 on the crane-girder 5, the frame carrying the tongs can be raised and lowered, so as to occupy any desired vertical position, the tongs can be opened and closed as desired, the shaft 19 may be turned throughout either the whole or any part of a rotation, so as to pour out the contents of the pot, and the frame 14, with its tongs and their load, can be rotated in a horizontal plane. Hence the placing of the pot accurately in the furnace or the pouring of the contents of the pot accurately upon a table located in any position may be readily effected.

In a construction such as shown in the drawings, in which the casting-hall is at right angles to the furnace-chamber, said casting-hall is provided with longitudinal girders 33, upon which is mounted a diagonally-braced carriage 34 of suitable construction, having rails which form continuations of those upon the girders 3 or 4 of the furnace-room, so that the crane-girder 5 can be readily run onto the carriage 34 and can with the latter be transported to any desired position in the casting-hall. When the crane carrying an empty pot is returned to the furnace-room, the pot may be readily recharged from a vessel 35, suspended from a supplementary trolley 36 on the crane-girder 5, as shown at the left-hand side of Fig. 2, the charging vessel being then run out of the way, as shown at the right-hand side of Fig. 2, while the freshly-charged pot is being placed in the furnace.

When the crane 5 is run onto the carriage 34, the latter can be moved to any desired position at which it is desired to run off the trolley 36 and its charging vessel 35 to be refilled. Hence it is not necessary to run the heavy trolley 6, with its tong-operating mechanism, to said filling-station.

It will be understood that the furnaces are intended to be provided with sliding and counterbalanced or other readily-movable doors.

With apparatus such as above described all of the operations of charging the pot with material, placing it in the furnace, removing the pot, with its fluid contents, from the furnace, conveying it to the casting-hall, pouring its contents upon the casting-table, and returning the pot to the furnace can be effected with the utmost expedition and accuracy with the aid of but a single attendant.

Hence as compared with present methods the operations are materially facilitated and the expense greatly reduced.

The details of the apparatus which we have shown and described may be modified in many ways by those skilled in the art without departing from the essential features of our invention.

Hence, without restricting ourselves to specific details of construction, we claim as our invention and desire to secure by Letters Patent—

1. Glass-pot-handling apparatus comprising a crane having a trolley with pot-gripping tongs combined with provision for opening and closing said tongs and for turning the same so as to tilt the pot, substantially as specified.

2. Glass-pot-handling apparatus comprising a crane with trolley having pot-gripping tongs combined with mechanism for opening and closing the same, for turning the tongs so as to tilt the pot, and for raising and lowering said tongs, substantially as specified.

3. Glass-pot-handling apparatus comprising a crane having two trolleys mounted thereon and movable independently of each other, one carrying the pot-handling mechanism and the other carrying a charging vessel whereby the pot may be refilled after being emptied, substantially as specified.

4. The combination of a crane having a trolley with frame mounted thereon, a shaft mounted in said frame and carrying a pair of pot-gripping tongs, and a rod passing through said shaft or spindle and serving to open and close said tongs, substantially as specified.

5. The combination of a crane, a trolley mounted thereon and provided with depending legs, a frame on said trolley having portions guided vertically by said depending legs, means on said trolley for raising and lowering said frame, a pair of horizontal gripping-tongs carried by said frame, and mechanism mounted on the frame for effecting a partial rotation of said tongs on the horizontal axis thereof for tipping a glass pot carried thereby, substantially as specified.

6. The combination of the crane, a trolley mounted so as to travel on said crane and having an annular rack, a ring mounted so as to be free to turn on said trolley and having gearing meshing with said rack, and a pair of gripping-tongs and mechanism for operating the same carried by said rings, substantially as specified.

In testimony whereof we have signed our names to this specification in the presence of two subscribing witnesses.

SAMUEL T. WELLMAN.
CHARLES H. WELLMAN.
JOHN W. SEAVER.

Witnesses:
C. W. COMSTOCK,
JOHN MCGEORGE.